(12) United States Patent
Whelan et al.

(10) Patent No.: US 7,606,242 B2
(45) Date of Patent: Oct. 20, 2009

(54) MANAGED ROAMING FOR WLANS

(75) Inventors: Robert Whelan, Kirkland, WA (US); Lamar Van Wagenen, Sandy, UT (US); Roy Morris, Bothell, WA (US)

(73) Assignee: Wavelink Corporation, Seattle, WA (US)

( * ) Notice: Subject to any disclaimer, the term of this patent is extended or adjusted under 35 U.S.C. 154(b) by 1234 days.

(21) Appl. No.: 10/211,841

(22) Filed: Aug. 2, 2002

(65) Prior Publication Data
US 2004/0198220 A1    Oct. 7, 2004

(51) Int. Cl.
*H04L 12/28* (2006.01)
(52) U.S. Cl. ................... 370/401; 370/338
(58) Field of Classification Search ............. 370/245, 370/328, 338, 329, 334; 455/432.1, 422.1
See application file for complete search history.

(56) References Cited

U.S. PATENT DOCUMENTS

| | | |
|---|---|---|
| 5,159,625 A | 10/1992 | Zicker |
| 5,241,598 A | 8/1993 | Raith |
| 5,586,304 A | 12/1996 | Stupek, Jr. et al. |
| 5,588,143 A | 12/1996 | Stupek, Jr. et al. |
| 5,732,275 A | 3/1998 | Kullick et al. |
| 5,742,829 A | 4/1998 | Davis et al. |
| 5,764,899 A | 6/1998 | Eggleston et al. |
| 5,809,251 A | 9/1998 | May et al. |
| 5,809,287 A | 9/1998 | Stupek, Jr. et al. |
| 5,812,531 A | 9/1998 | Cheung et al. |
| 5,838,730 A | 11/1998 | Kripps |
| 5,870,610 A | 2/1999 | Beyda |
| 5,896,566 A | 4/1999 | Averbuch et al. |
| 5,901,320 A | 5/1999 | Takahashi et al. |

(Continued)

FOREIGN PATENT DOCUMENTS

EP    1 081 895    3/2001

(Continued)

OTHER PUBLICATIONS

International Search Report for Appln. No. PCT/US03/20502 dated Dec. 15, 2003.

(Continued)

*Primary Examiner*—Duc C Ho
(74) *Attorney, Agent, or Firm*—Jones Day (57) ABSTRACT

The present invention allows any number of mobile units to roam between a large numbers of sub-networks, each with a large number of access points (tens of thousands or more total access points), with minimal direct administration effort. A hierarchy of management servers may be used across the multiple sub-networks, which can be under the control of multiple entities. The invention provides the capability for the mobile units to authenticate the access points associated with, to ensure they are both authorized and managed. Peer-to-peer and ad hoc associations between mobile units are managed as well. The invention may enforce a number of association policies such as, for example, forcing the mobile unit to only associate with access points or mobile units on a previously set mandatory association list, providing the mobile unit with a list of preferred access points to associate with, but allowing association with other access points, or providing the mobile unit with a excluded association list of access points or mobile units it is not to associate with.

60 Claims, 5 Drawing Sheets

System Diagram

U.S. PATENT DOCUMENTS

| | | | |
|---|---|---|---|
| 5,905,719 | A | 5/1999 | Arnold et al. |
| 5,909,437 | A | 6/1999 | Rhodes et al. |
| 5,930,513 | A | 7/1999 | Taylor |
| 5,930,704 | A | 7/1999 | Kay et al. |
| 5,974,312 | A | 10/1999 | Hayes et al. |
| 5,987,575 | A | 11/1999 | Yamaguchi |
| 5,999,741 | A | 12/1999 | May et al. |
| 6,006,034 | A | 12/1999 | Heath et al. |
| 6,009,274 | A | 12/1999 | Fletcher et al. |
| 6,023,585 | A | 2/2000 | Perlman et al. |
| 6,047,129 | A | 4/2000 | Frye |
| 6,049,671 | A | 4/2000 | Slivka et al. |
| 6,052,531 | A | 4/2000 | Waldin, Jr. et al. |
| 6,052,600 | A | 4/2000 | Fette et al. |
| 6,075,943 | A | 6/2000 | Feinman |
| 6,078,663 | A | 6/2000 | Yamamoto |
| 6,134,593 | A | 10/2000 | Alexander et al. |
| 6,167,137 | A | 12/2000 | Marino et al. |
| 6,167,514 | A | 12/2000 | Matsui et al. |
| 6,178,512 | B1 | 1/2001 | Fifield |
| 6,347,398 | B1 | 2/2002 | Parthasarathy et al. |
| 6,453,159 | B1* | 9/2002 | Lewis ................ 455/411 |
| 6,463,584 | B1 | 10/2002 | Gard et al. |
| 6,490,291 | B1 | 12/2002 | Lee et al. |
| 6,526,506 | B1 | 2/2003 | Lewis |
| 6,611,500 | B1 | 8/2003 | Clarkson et al. |
| 6,628,934 | B2 | 9/2003 | Rosenberg et al. |
| 6,701,435 | B1 | 3/2004 | Numao et al. |
| 6,782,263 | B1 | 8/2004 | Peltola et al. |
| 6,788,656 | B1* | 9/2004 | Smolentzov et al. ....... 370/328 |
| 6,870,822 | B2* | 3/2005 | Balogh ................ 370/332 |
| 6,950,670 | B2 | 9/2005 | Chang et al. |
| 7,194,004 | B1* | 3/2007 | Thomsen ............... 370/401 |
| 2001/0023446 | A1* | 9/2001 | Balogh ................ 709/229 |
| 2002/0007407 | A1 | 1/2002 | Klein |
| 2002/0057803 | A1 | 5/2002 | Loos et al. |
| 2002/0077094 | A1 | 6/2002 | Leppanen |
| 2002/0085719 | A1* | 7/2002 | Crosbie ................ 380/248 |
| 2002/0105925 | A1 | 8/2002 | Shoemake |
| 2002/0116698 | A1 | 8/2002 | Lurie et al. |
| 2002/0118664 | A1* | 8/2002 | Ishibashi et al. ........ 370/338 |
| 2002/0157090 | A1 | 10/2002 | Anton, Jr. |
| 2002/0178241 | A1 | 11/2002 | Erikkson |
| 2002/0183056 | A1 | 12/2002 | Lundblade et al. |
| 2002/0198013 | A1 | 12/2002 | Panasik et al. |
| 2003/0005290 | A1 | 1/2003 | Fishman et al. |
| 2003/0005427 | A1 | 1/2003 | Herrero |
| 2003/0013434 | A1 | 1/2003 | Rosenberg et al. |
| 2003/0032417 | A1 | 2/2003 | Minear et al. |
| 2003/0033209 | A1 | 2/2003 | Minear et al. |
| 2003/0060896 | A9 | 3/2003 | Hulai et al. |
| 2003/0061606 | A1 | 3/2003 | Hartwig et al. |
| 2003/0078037 | A1 | 4/2003 | Auckland et al. |
| 2003/0117985 | A1 | 6/2003 | Kazuo et al. |
| 2003/0135762 | A1 | 7/2003 | Macaulay et al. |
| 2003/0186679 | A1 | 10/2003 | Challener et al. |
| 2003/0202486 | A1* | 10/2003 | Anton et al. ............ 370/329 |
| 2003/0217289 | A1 | 11/2003 | Ammon et al. |
| 2004/0001467 | A1* | 1/2004 | Cromer et al. .......... 370/338 |
| 2004/0022186 | A1 | 2/2004 | Kump et al. |
| 2004/0023639 | A1 | 2/2004 | Noel, Jr. |
| 2004/0023640 | A1 | 2/2004 | Ballai |
| 2004/0025047 | A1 | 2/2004 | Mayne et al. |
| 2004/0054774 | A1* | 3/2004 | Barber et al. ........... 709/224 |
| 2004/0078598 | A1* | 4/2004 | Barber et al. ........... 713/201 |
| 2004/0082327 | A1 | 4/2004 | Kim et al. |
| 2004/0137915 | A1 | 7/2004 | Diener et al. |
| 2004/0166812 | A1 | 8/2004 | Lumelsky |
| 2004/0176032 | A1 | 9/2004 | Kotola et al. |
| 2004/0203459 | A1 | 10/2004 | Borras-Chia et al. |
| 2004/0203593 | A1 | 10/2004 | Whelan et al. |
| 2005/0114649 | A1 | 5/2005 | Challener et al. |
| 2005/0195841 | A1 | 9/2005 | Dowling |
| 2005/0215263 | A1 | 9/2005 | Tsien et al. |

FOREIGN PATENT DOCUMENTS

| | | |
|---|---|---|
| WO | WO 99 01969 | 1/1999 |
| WO | WO 01/61965 A1 | 8/2001 |
| WO | WO 03/083601 A2 | 10/2003 |

OTHER PUBLICATIONS

International Search Report for Appln. No. PCT/US03/15964 dated Dec. 2, 2003.
International Publication No. WO 2003/100561 A3 dated Dec. 4, 2003.
Written Opinion of PCT/US03/15964 dated May 7, 2004.
Article by A.K. Salkintzis, et al.: "WLAN-GPRS Integration For Next-Generation Mobile Data Networks," *IEEE Wireless Communications, IEEE Service Center*, (Oct. 5, 2002, vol. 9, No. 5).
International Search Report for PCT/US02/26265 dated Mar. 13, 2003.
International Search Report for PCT/US03/24180 dated Jun. 1, 2004.
European Search Report EP 00 10 3334 dated Dec. 14, 2000.
International Search Report No. PCT/US03/24885 dated Sep. 27, 2004.
Published Application No. WO/2004/073243 dated Aug. 26, 2004.
International Search Report of PCT/US/04/004387 dated Aug. 18, 2004.
Written Opinion of PCT/US/04/004387 dated Aug. 18, 2004.
European Office Action of European Appln. No. 03 785 061.7 dated Sep. 26, 2005.
Article by Bob Brewin: "IBM Develops Tool to Detect Rogue Wireless LAN Access Points," *Computerworld* (Jun. 17, 2002): <URL:http://www.computerworld.com/printthis/2002/0,4814,72065,00.html>.
Article No. XP-002263356 entitled: "IBM Researchers Demonstrate Industry's First Self-Diagnostic Wireless Security Monitoring Tool," *IBM Research News* (Jun. 17, 2002): <URL:http://www.research.ibm.com/resources/news/20020617_dwsa.shtml>.
Article No. XP-002263357 entitled: "IBM Research Demonstrate Industry's First Auditing Tool for Wireless Network Security," *IBM Research News* (Jul. 12, 2001): <URL:http://www.research.ibm.com/resources/news/20010712_wireless,shtml>.
"CA & Partners Real World Management Solutions for Mobile eBus", *LexisNexis*, 3 pages, Apr. 12, 2000.
"On-line Management Becomes the Real Thing: Online Management Products and Services Provided by eStar Technologies and Computer Associates", *Lyn Reiner*, 2 pages, Aug. 27, 1999.
"Partnerships Connect Users with Diagnosis", *LexisNexis*, vol. 6, No. 4, 1 page, Aug. 1999.
Antony Bruno, "Firms Give Mobile Twist to Corporate Apps", *LexisNexis*, vol. 18, No. 31, p. 29, Aug. 2, 1999.
John Saunders, "A New Twist from 3Com, PageNet, CA, Computer Associates International, 3Com and PageNet develop the Twist wireless network management technology, Company Business and Marketing", Jul. 30, 1999, 2 pages.
"PageNet and CA launch wireless extension for Unicenter TNG", Jul. 23, 1999, 1 page.
Computer Associates AWIG: Pagenet and CA announce availability of wireless extension for Unicenter TNG, Jul. 20, 1999, 3 pages.
Antony Bruno Vast unit part of PageNet's Evolution, *LexisNexis*, 2 pages, Jul. 19, 1999.
Blaise Zerega, et al., "CA, PageNet announce paging-based network management" *LexisNexis*, Jun. 16, 1998, 2 pages.
BMC Software Integrates Award Winning Patrol Product with Computer Associates Industry-Leading Unicenter TNG, *LexisNexis*, 3 pages, Mar. 17, 1998.
Jim Duffy, "Tivoli tools target output management", *LexisNexis*, 2 pages, Mar. 2, 1998.
Wireless Predictive Features Near for TNG—Unicenter enhancements come amid slower client-server revenue growth for CA, *LexisNexis*, 1 page, Jan. 26, 1998.

"American Mobile Satellite Corp. and Computer Associates Extend Wireless Enterprise Applications for eBusiness", *LexisNexis*, 2 pages, Apr. 20, 2000.

Joaquim Menezes, Extending The Reach Technology extends remote network connectivity and intelligence to a plethora of remote applications, *Company Business and Marketing*, vol. 26, No. 11, p. 25, 2 pages, May 26, 2000.

EverTrac Partners with Paradigm Advanced Technologies to Advance Location Aware Market for B2B with Unique Out-Of-The-Box Solutions, *Canadian Newswire*, Oct. 24, 2000, 2 pages.

"EverTrac Paradigm form Partnership", 1 page, Oct. 30, 2000.

"CA Debuts New Version of Unicenter TNG SDO", vol. 11, No. 11, 3 pages, Nov. 2000.

Matthew G. Nelson, et al., "CA Takes Unicenter eTrust Wireless with Partners Help—Enterprise Tools Are Designed to Help Companies Manage Multiple Mobile Initiatives", 1 page, Mar. 26, 2001.

Debbie Dubie, "CA Finds Mobile Mgmt. Partners—The Company extends its network mgmt. software to wireless", 2 pages, Mar. 26, 2001.

Polytechnical University selects CA's Inicenter TNG to manage network with new wireless connectivity options, CA's Mobile eBusiness Solution to provide 24×7 system availability for students and faculty *M2 Presswire*, Apr. 27, 2001, 2 pages.

"Computer Associates and w-Technologies deliver multi-platform wireless access to CA's Unicenter TNG; Partnership enables IT staff to manage eBusiness environments from full range of handheld client devices", *M2 Presswire*, May 9, 2001, 2 pages.

"CA extends leadership in mobile management with second wave of strategic partnership Announcements at Networld-Interop underscores value of C A's solutions in next generation wireless implementations", *M2 Presswire*, May 9, 2001, 2pages.

Lucent Technologies to Provide ORiNOCCO Wireless Networking and Internet Access for HP PCs, *PR Newswire*, Jun. 27, 2000, 2 pages.

"HP Stakes Claim in Mobile e-Services Management Market, Nexttenso, Nokia and TANTAU Collaborate with HP Open View for Development of Mobile e-Services Management Software", *Business Wire*, Nov. 14, 2000, 3 pages.

"Broadband Week Direct", Mar. 19, 2001, 4 pages.

Spike Broadband Systems Announces Global OEM Agreement with HP, Spikes to offer Solution based HP Open View to improve Management of Wireless and Wireless Networks, *Business Wire*, Mar. 19, 2001, 3 pages.

"Aether Systems Announces Wireless Management for HP Open View", 1 page No Specific Date announce Jun. 15 Convention with booth information.

\* cited by examiner

Figure 1. System Diagram

Figure 2A. Process Flow

Figure 2B. Process Flow

Figure 2C. Process Flow

Figure 3. Alternative System Diagram

MANAGED ROAMING FOR WLANS

FIELD OF THE INVENTION

The present invention relates to the management of mobile unit roaming on Wireless Local Area Networks (WLAN). More specifically, the invention relates to a system to aid in network management and to enhance network security by controlling policy for the associations between mobile units and known and managed access points.

BACKGROUND OF THE INVENTION

WLANs are now in common use in both large and small businesses, as public Internet access points, and in home environments. Millions of access points and mobile units are now deployed. Enterprises commonly deploy wireless access points on one or more sub-networks often at multiple geographic locations. There is a growing trend toward employing WLAN technology for public Internet access points used by travelers or other mobile users. In a WLAN, one or more base stations or Access Points (AP) bridge between a wired network and radio frequency or infrared connections to one or more mobile stations or Mobile Units (MU). The MUs can be any of a wide variety of devices including, laptop computers, personal digital assistants, wireless bar code scanners, wireless point of sale systems or payment terminals, and many other specialized devices. Most WLAN systems used in business and public access environments adhere to one or more of the IEEE 802.11 family of specifications.

Since access points use a simple bridging protocol they can be added to any wired protocol compatible network without any centralized control or intervention and once added are difficult to detect. For example, an IEEE 802.11 compliant access point can be made operational by simply connecting it to a wired Ethernet and applying power. In some cases well-intentioned individuals, who do not realize the potential problems they may be creating, add unauthorized access points to wired LANS. In other cases, a malicious attacker or hacker adds the access point to the wired LAN to gain unauthorized access. These unauthorized and unmanaged access points are known as rouge access points. In yet other cases, an access point on another network or sub-network associates with an organization's mobile units. These cases can include situations were a hacker attempts to deliberately spoof the mobile units into associating with a malicious access point. Unauthorized access points attached to other networks are referred to as foreign access points. To prevent these problems, a means is required to allow network administrators to control which access points a mobile unit associates with.

Present IEEE 802.11 WLAN standards are designed to facilitate the roaming of mobile units between multiple access points, which may be connected to one or more wired LANs. As a mobile unit travels from the coverage area of one access point to another it will associate with the new access points using the Extended Service Set (ESS) protocols. The new access point the mobile unit associates with can be on the same sub-network or another sub-network. The standard IEEE 802.11 protocols provide no capabilities for external management of the roaming process. In addition, the IEEE 802.11 standards provide no means for a mobile unit to authenticate an access point.

Several methods including the RADIUS protocols and the Extensible Authentication Protocol (EAP, RFC 2284) provide capabilities to authenticate end-to-end connections. Likewise, Virtual Private Networks (VPN) create secure tunnels through public networks. A related scheme using a proxy server and address translation is disclosed in EP 11113641 to Moles and Herle. None of these protocols allows a mobile unit to determine if it is connected to the desired access point and therefore the correct network or sub-network.

Mobile unit radio drivers typically provide the capabilities to set a preferred Basic Service Set Identifier (BSSID) or exclusive BSSID. In practice, the BSSID is equal to the MAC address of the access point for the association. Thus, the radio drivers provide the ability to instruct the mobile unit to prefer a particular single access point association or to exclusively use a particular single access point association. This limited capability does not allow for the external management of the multiple access point associations possible for a roaming mobile unit, and supported by the ESS protocols.

Access control lists are commonly used to manage the access of users and client programs to network services and data. Numerous examples of access control list management environments can be found include, those sold by Baltimore Technologies, IBM's Tivoli Division, and the capabilities built into Microsoft's Windows 2000 operating system. Yet none of these technologies provides the ability to manage the dynamic roaming and access point associations required in a WLAN environment. Further, these technologies do not provide a means for the mobile unit to authenticate the access point or any other common network infrastructure.

Other prior art describes various schemes to facilitate the handoffs between access points when a mobile unit roams. Yet none of these systems address the management or authentication of the associations between the mobile units and the access points. Examples of such systems are disclosed in WO 0215472 to Singhal, et. al., U.S. Pat. No. 5,594,731 to Reissner, U.S. Pat. No. 3,212,806 to Natarajan, and U.S. Pat. No. 6,188,681 to Vesuna Several schemes have been proposed to provide for mutual authentication between access points and mobile units. Two such schemes are disclosed in EP 1178644 to Jorma, et. al., and US 20001 0048744 to Kimura. Both of these schemes assume that each access point and each mobile unit has access to the required security keys. Further, these schemes assume that suitable modifications can be made to the access points to accommodate these protocols.

SUMMARY OF THE INVENTION

In one aspect the present invention comprises a system for securely accessing a wireless network, further comprising a wireless mobile device configured to use wireless network protocols conforming to one or more of the IEEE 802.11 family of specifications; a program executing on the wireless mobile device; the program being configured to cause the mobile device to use an association control list to control communication with access points; the association control list comprising a plurality of BSSIDs; the program being further configured to update the association control list by communicating with a server.

In another aspect, the invention comprises a system for securely accessing a wireless network, further comprising a wireless mobile device; a program executing on the wireless mobile device; the program being configured to cause the mobile device to use an association control list to control communication with access points; the association control list comprising digital data representing information concerning at least one access point and whether the wireless mobile unit should communicate with the at least one access point.

In still another aspect, the present invention comprises a system for securely accessing a wireless network, further comprising: a wireless mobile device comprising a processor and memory; a program executing on the wireless mobile device; the program being configured to cause the wireless mobile device to associate with an access point and to send a request to a server for confirmation that the access point is authorized; the access point comprising a wireless device for communicating with wireless devices and a wired network interface for communicating via a wired network.

In still another aspect, the invention comprises a system for securely accessing a wireless network, further comprising: a server configured to receive a request to authenticate an access point from a wireless mobile device; the server being further configured to determine whether the wireless mobile device is associated with the access point and whether the access point is authorized, and to provide a response to the wireless mobile device indicating whether the mobile device is authorized to continue association with the access point.

In another aspect, the invention comprises a wireless communication security system, further comprising: a first wireless mobile device; a program executing on the first wireless mobile device; the program being configured to cause the first wireless mobile device to use an association control list to control communication with other wireless mobile devices; the association control list comprising a plurality of identifiers, each identifier uniquely identifying a wireless mobile device.

In another aspect, the invention comprises a system for securely accessing a wireless network, further comprising a wireless mobile device; a program executing on the wireless mobile device; the program being configured to cause the mobile device to use an association control list to control communication with access points and to update the association control list by communicating with a server.

In yet another aspect, the system comprises a system for securely accessing a wireless network, comprising a server system comprising at least one server computer and at least one software program executing on the at least one server computer; the at least one server computer being operatively connected to a communications network; the system being configured to receive at least one access point identifier from a wireless mobile unit; the system being further configured to transmit to the wireless mobile unit information concerning at least one access point and whether the mobile unit should communicate with the at least one access point.

In another aspect, the invention comprises a system for securely accessing a wireless network, further comprising an access point comprising a wireless device for communicating with wireless devices and a wired network interface for communicating via a wired network; the access point being configured to wirelessly transmit an association control list; the association control list comprising digital data representing information concerning at least one access point and whether at least one wireless mobile unit should communicate with the at least one access point.

In another aspect, the invention comprises a system for securely accessing a wireless network, further comprising a wireless mobile unit comprising a processor and memory; a program executing on the wireless unit, the program being configured to cause the wireless mobile unit to transmit to a server system a data structure comprising identifiers of access points within range of the wireless mobile units; the program being further configured to receive from the server system information concerning at least one access point and whether the mobile unit should communicate with the at least one access point.

In still another aspect, the invention comprises a system for securely accessing a wireless network, further comprising: a wireless mobile unit comprising a processor and memory; a program executing on the wireless unit, the program being configured to cause the wireless mobile unit to receive an association control list from an access point; the association control list comprising digital data representing information concerning at least one access point and whether the wireless mobile unit should communicate with the at least one access point.

The foregoing statements of the features of the invention are not intended as exhaustive or limiting, and the proper scope of the invention is to be understood with reference to this entire disclosure and to the claims.

BRIEF DESCRIPTION OF THE DRAWINGS

The invention will be described by reference to the preferred and alternative embodiments thereof in conjunction with the drawings in which.

DETAILED DESCRIPTION OF PREFERRED EMBODIMENTS

The following detailed description refers to the accompanying drawings and describes exemplary embodiments of the present invention. Other embodiments are possible and modifications may be made to the exemplary embodiments without departing from the spirit, functionality and scope of the invention. Therefore, the following detailed descriptions are not meant to limit the invention.

The invention provides the capability for the mobile units to authenticate the access points with which they associate with, to ensure they are authorized and/or managed. In addition, the system can enforce a number of association policies including:

(a) forcing the mobile unit to only associate with access points on a previously set mandatory association list;
(b) providing the mobile unit with a list of preferred access points to associate with, but allowing association with other access points; and,
(c) providing the mobile unit with an excluded association list of access points it is not to associate with.

The invention manages the access point associations of mobile units through the distribution and management of association lists from one or more management servers to management clients on the one or more mobile units. The lists can contain mobile unit identifiers (preferably BSSIDs) for access points with which the mobile unit must exclusively associate, the BSSIDs for access points the mobile unit preferentially associates with, and identifiers for access points with which the mobile unit is excluded from associating. Mobile units using mandatory association lists will typically not need to maintain preferred association lists or excluded association lists. Typically, mobile units using mandatory association lists are used in a restricted environment where network managers want to limit the roaming of the mobile unit. Mobile units maintaining preferred association lists can, optionally, maintain excluded association lists or vise versa. Mobile units using preferred association lists and excluded association lists are free to roam to any access point (except the excluded ones), as required, but will use the preferred access points (if available).

When a mobile unit roams to an access point on a new sub-network it can optionally perform a login procedure with a security server, during which authentication information, such as shared secret information, is typically exchanged. At the same time the mobile unit typically verifies the access point being used through the security server to verify that it is in fact a known and managed access point. The login procedure provides verification to the security manager that the mobile unit is an authorized one. The verification of the access point demonstrates it is the authorized access point and not another access point spoofing the legitimate authorized access point. As the mobile unit roams from one access point to another within the same sub-network, the security server preferably verifies each access point with which the mobile unit associates to ensure that the mobile unit is not being spoofed.

The invention allows management of mobile unit associations with numerous access points attached to a large number of wired sub-networks. Many existing access points do not have the flexibility to manage large association lists or to directly perform authentication protocols with the mobile units. Further, it may be impractical in some organizations to create and distribute a single association list for all access points. When a mobile unit, using a preferred association list, first connects to a new sub-network, possibly in a new geographic location, it determines which access points have sufficient signal strength to associate with. The mobile unit looks in the preferred association list to determine if any of the access points are on the list, and if so initiates an association with them. If none of the access points are on the preferred association list the mobile unit checks the excluded association list (if any) to verify that it can associate with one or more of the access points. The mobile unit then associates with any one of the allowed access points on a temporary basis. Once an association is made, the mobile unit generally logs into a security server and authenticates the access point. The mobile unit then connects to a management server and down loads the preferred association list for that sub-network. The mobile unit can maintain the current association if the access point being used is on the preferred association list. If not, the mobile unit will attempt to discover and associate with an access point on the preferred association list, as part of normal operation.

The invention provides the capability for mobile units to use the services of multiple security servers and roaming management servers under control of one or more organizations. Each set of servers can manage one or more sets of association lists for the access points under control of these organizations. The lists can be organized in a hierarchical manner. In one example, an organization may have the top level of the hierarchy controlled by the servers at the headquarters, and with servers on sub-networks in departments or at regional offices controlling lower levels of the hierarchy. The hierarchy can be further organized to manage network traffic, network access, etc., as required. The organization may choose to have access points on its own sub-network used for primary access, and those of an external service provider used for secondary access. In this way, the organization can minimize the fees paid to the service provider, while still gaining benefits of the service. In another example, the public access point service provider uses the hierarchical association lists to require customers' mobile units to preferentially associate with the company's access points and use roaming partners' access points only when one of the company's own access points is not accessible.

In cases where a mobile unit is using a mandatory association list and must connect to a new sub-network the invention provides a secure wired list update or synchronization capability. The mobile unit connects to the wired network, and optionally authenticates with a security server. A management server then loads a new or updated exclusive association list into the mobile unit. Using this new list, the mobile unit can begin communications with any access points on the list. Mobile units using preferred access lists or exclusion lists can use the same wired update and synchronization capability if they are unable to update those lists over the wireless network.

Since new access points can be added to any of the wired sub-networks at any time, the management server attempts to auto-discover the presence of the new access points. Typically, the management server auto-discovers a new access point by detecting its MAC address through monitoring of layer 2 packet headers or by monitoring inter-access point communications. Once a new access point is auto-discovered, the management server adds it to the appropriate mobile unit access management lists. A network management server may then automatically configure the access point to reflect the organization's network management policies and procedures. Generally, only access points that can be profiled and managed are added to the access lists. Access points that are of unknown or unmanageable types are typically added to the excluded list. At the same time the security server will enforce security policies for the newly discovered access points and will subsequently be able to authenticate the association of mobile units with the new access points. As an added security and network administration measure, the management server may query a network administrator for approval before updating the lists. If multiple, distributed management servers are used, list updates are propagated to the other servers, as required. The update association management list is then sent to all mobile units associated with the managed access points on the sub-network.

Peer-to-peer or ad-hoc associations created between mobile units introduce particular security and network management problems. Hackers can use peer-to-peer associations to gain unauthorized access to data and networks. To address these and other problems the invention provides the capability to manage peer-to-peer associations. Peer-to-peer association policies, which can be enforced with the invention, can include but are not limited to:

(a) not allow any peer-to-peer or ad-hoc associations;
(b) only allow peer-to-peer associations between mobile units with mutual authentication capability, information on which mobile units have this capability possibly coming from a preferred association list;
(c) only allow peer-to-peer associations between mobile units on a specific mandatory association list; and,
(d) only allow peer-to-peer associations between mobile units on a specific mandatory association list, and for which mutual authentication is possible.

Figure 1:
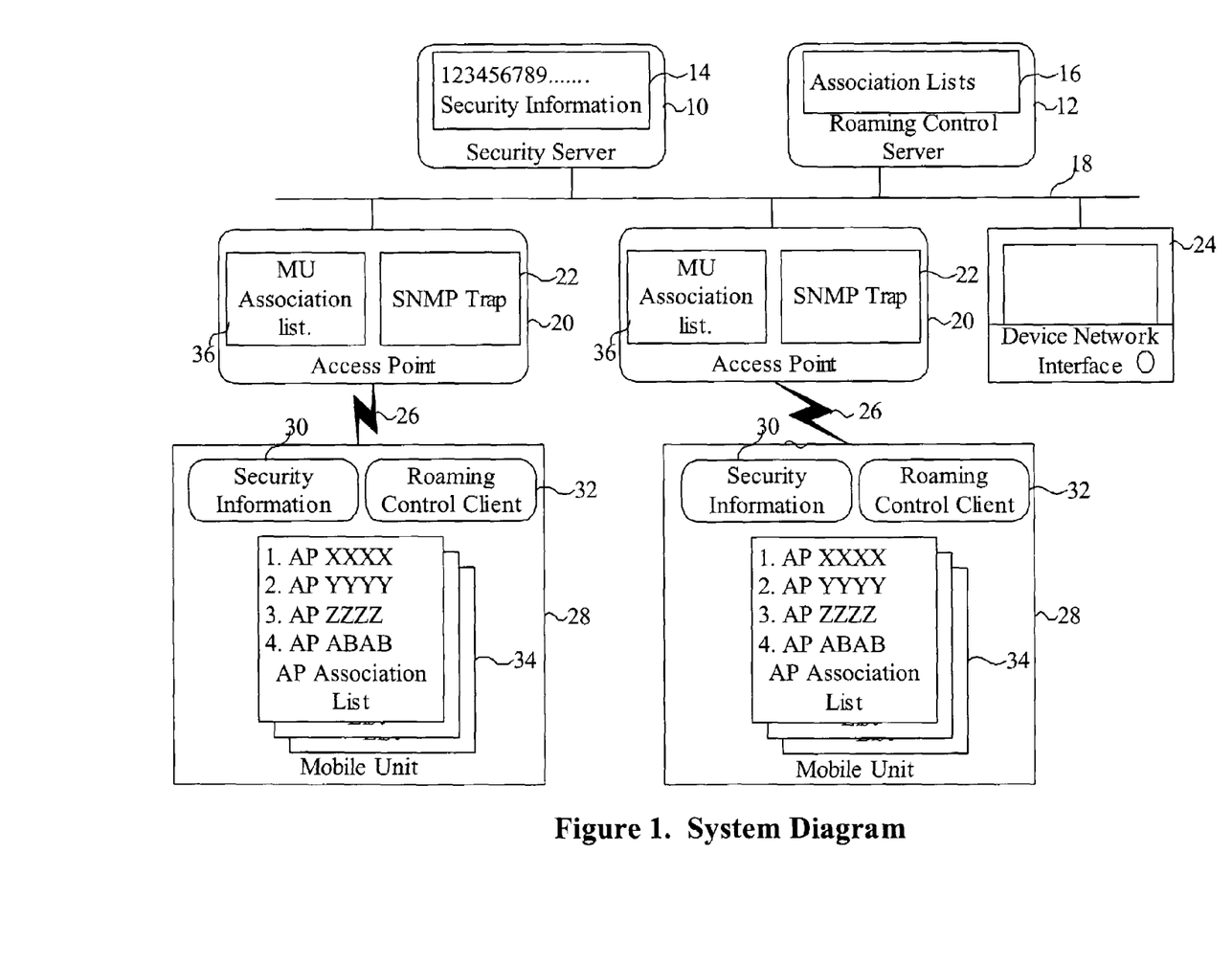
FIG. 1 is an overall schematic diagrammatic view according to one embodiment of the invention.

A diagrammatic view of one embodiment of the invention is shown in FIG. 1. This discussion is intended to show an exemplary embodiment only. It will be understood by those skilled in the art that the functional blocks shown on the diagram can be combined or further distributed as required for a given implementation without changing the function, scope or spirit of the invention.

The roaming control client 32 manages roaming of the mobile units 28 between the multiple access points 20 on one or more sub-networks 18 through the wireless links 26. The roaming control client uses the one or more AP association lists 34 to determine mandatory access point associations, preferred access point associations and excluded access point associations.

When mobile units 28 roam to new sub-networks 18 or are initialized, one or more security servers 10 authenticate the mobile units 28, typically using security information stored by the server 14 and in the mobile unit 30. The security server also provides a means for the mobile units to authenticate associations with access points 20, typically using Simple Network Management Protocol (SNMP) traps 22 and MU association lists 36.

The roaming server 12 creates and maintains association lists 16 which are distributed to the mobile units 28 for storage 34. The roaming control client 32 on the mobile unit 28 uses these one or more association lists to manage the roaming of the mobile unit between access points 20 on one or more sub-networks 18. A mobile unit can receive a set of hierarchically organized lists from multiple roaming control servers, which are, themselves, hierarchically organized and possibly under control of different organizations.

The one or more sub-networks 18 are typically interconnected and provide connectivity between one or more security servers 10, one or more roaming control servers 12, the mobile units 28, and the access points 20. The security servers and roaming servers are organized hierarchically and a server can be used on one or more sub-networks. Control or administration of the servers typically falls to the organization controlling the sub-networks managed. In some embodiments the roaming control servers and/or security servers can be distributed to execute in whole or in part on the access points 20. In some embodiments, the association lists are created on one or more centralized or distributed roaming control servers, and stored on the access points, from which, the lists are distributed to the mobile units.

When a mobile unit 20 requires synchronization of the access point association lists 34 or shared secret keys 30 through the wired network 18, the mobile unit is connected to the network device interface 24. Once connected to the network device interface the mobile unit can directly communicate to the one or more roaming servers 12 and one or more security servers 10. The network device interface can be of any suitable type including, a network interface card for direct cable connection or a cradle.

Preferred Association List Process Flow

Figure 2A:
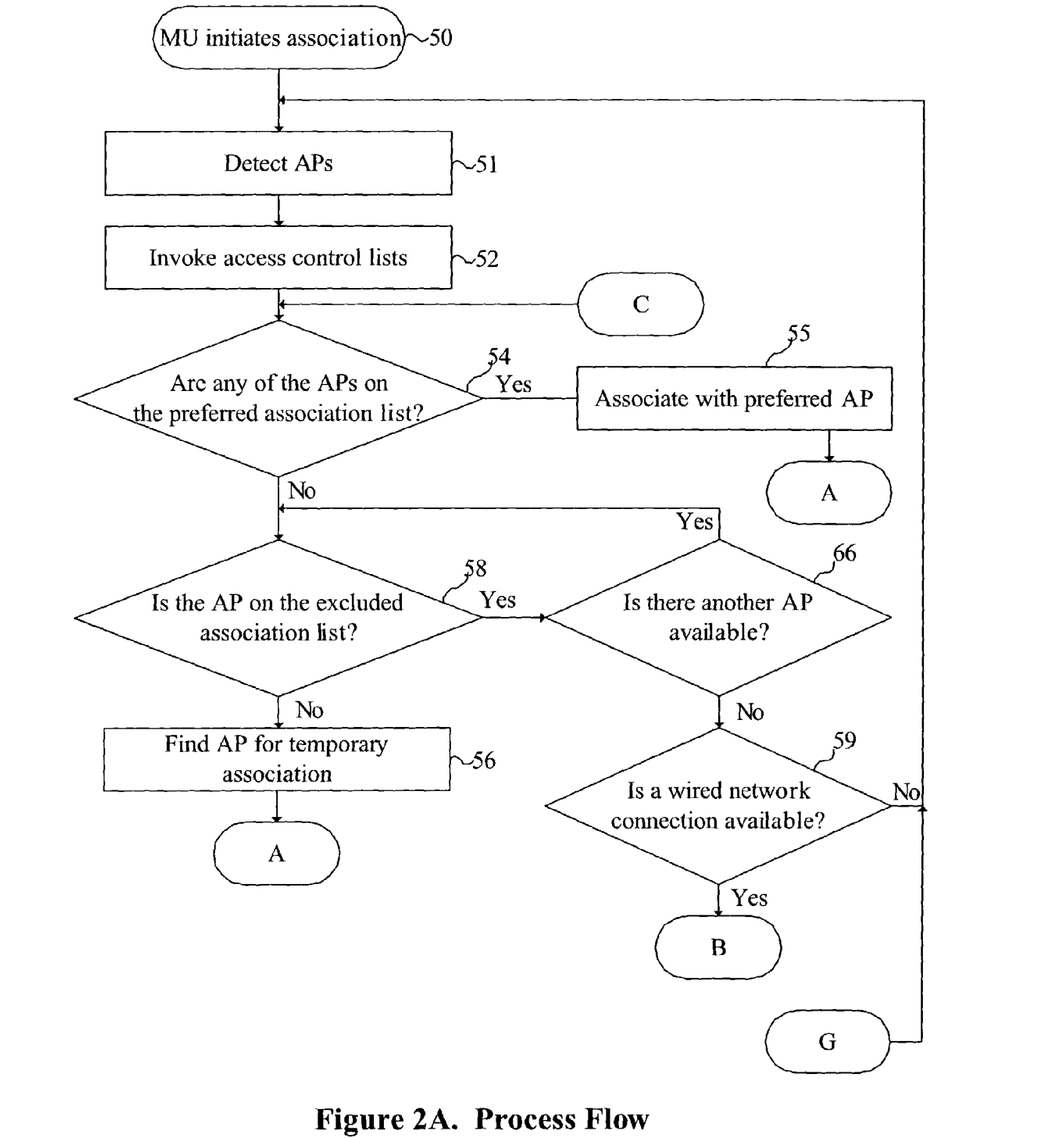
FIG. 2A, FIG. 2B, and FIG. 2C is a process flow diagram according to one embodiment of the invention; and, FIG. 3 is an overall schematic diagrammatic view according to another embodiment of the invention
Figure 2B:
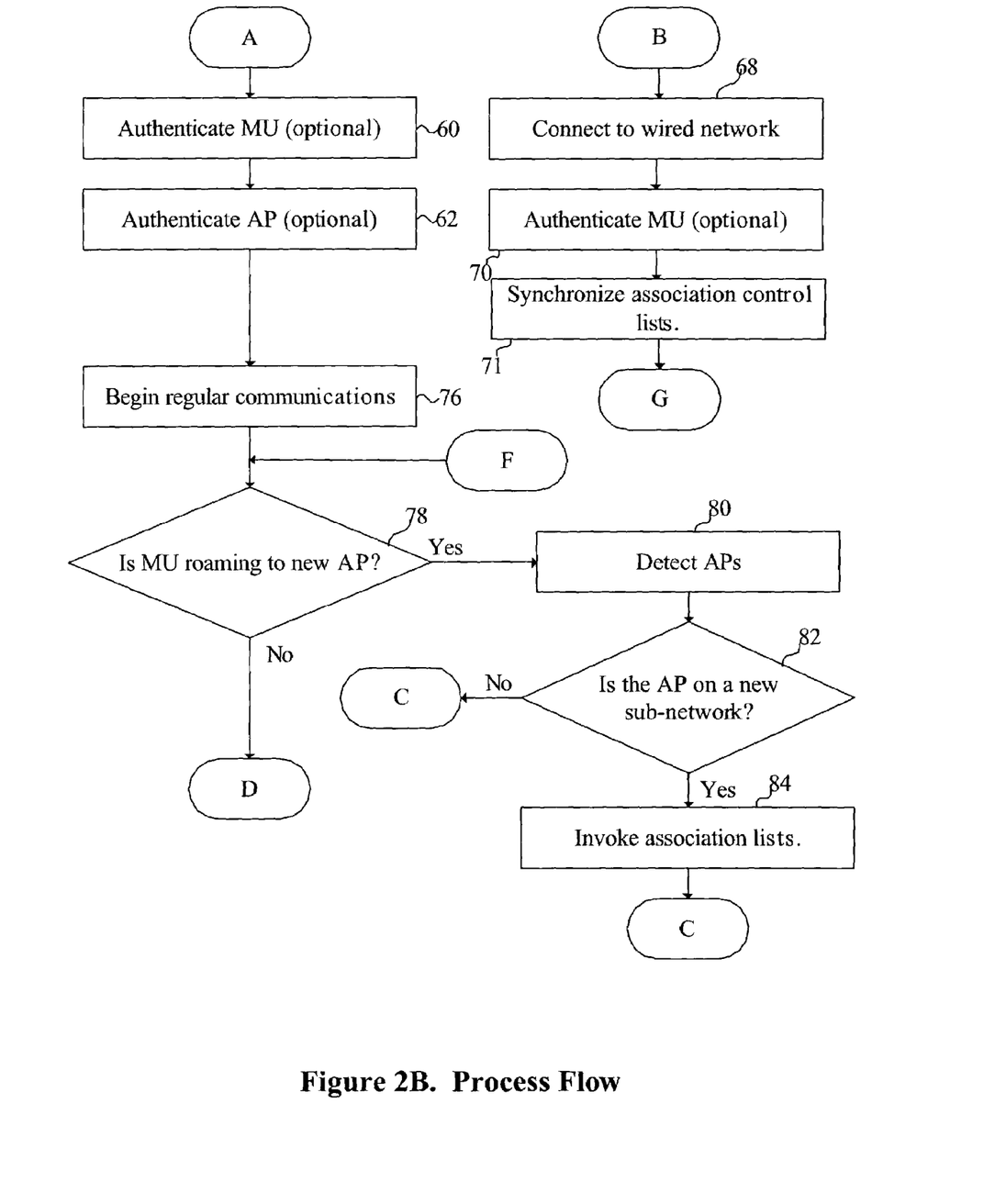
Figure 2C:
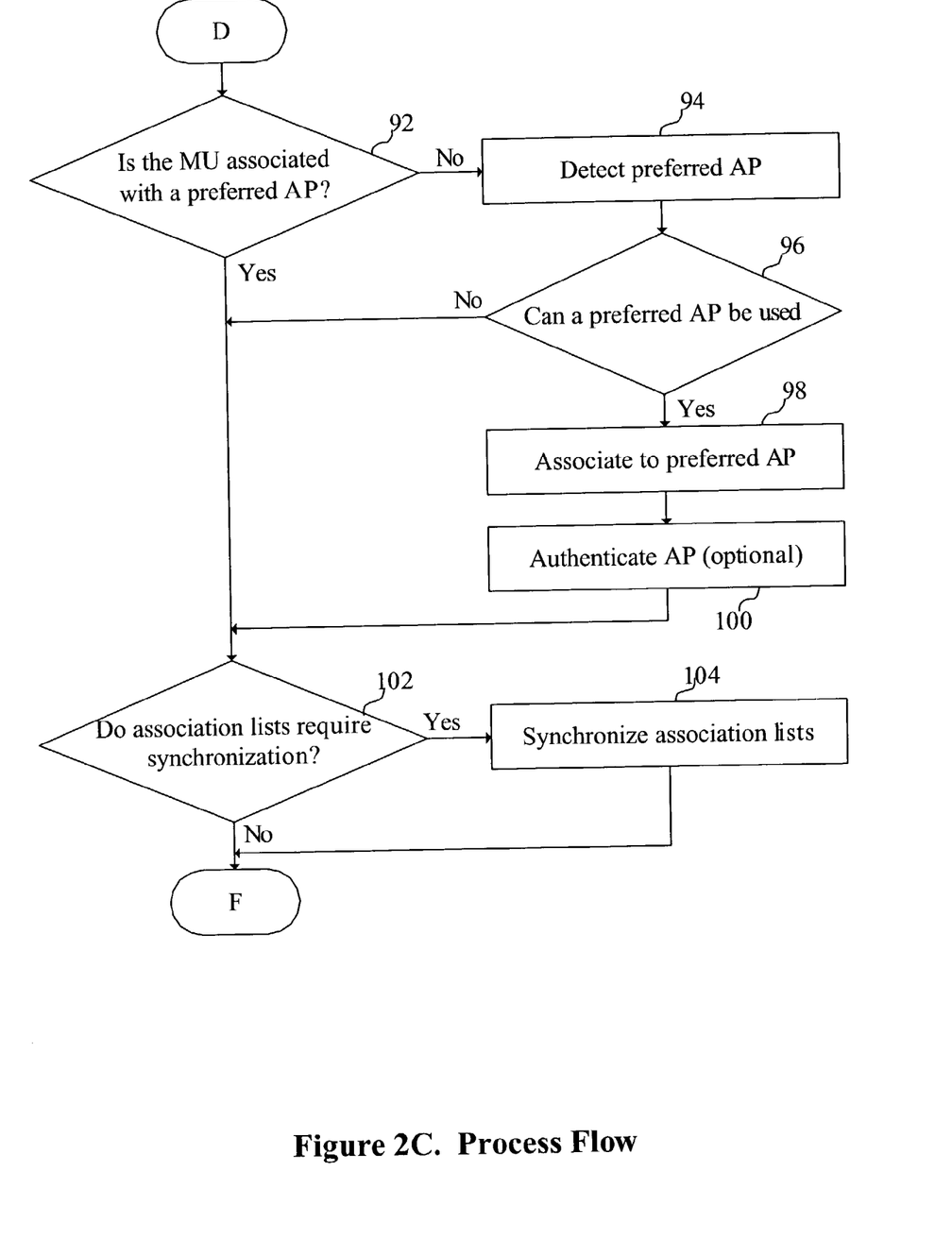

Mobile units 28 can connect to or roam to one or more sub-networks 18 where they associate with one or more access points 20 under control of the roaming control client 32. Once a mobile unit has associated with an access point, it can roam to other access points on the same sub-network or roam to another sub-network. A process flow diagram for a mobile unit using a preferred association list 34 and an optional excluded association list 34 is shown in FIGS. 2A, 2B, and 2C. This discussion is intended to be an exemplary embodiment only. It will be understood by those skilled in the art that the order the steps described can be changed, certain steps can be removed and new steps added without changing, the scope, spirit or functionality of the invention.

A mobile unit 28 initiates an association process 50 to an access point 20 on a sub-network 18 either when it is initialized or roams to the new sub-network. The mobile unit detects available access points 51, typically using the methods specified in the IEEE 802.11 specifications. Based on the sub-network identification (or ESSID) the roaming control client invokes 52 the correct set of association control lists 34. The roaming control client on the mobile unit determines 54 if any of the detected access points are on its preferred association list 34. If one or more of the access points is on the preferred list, the mobile unit will associate with the preferred access point 55. The security server 10 then optionally authenticates the mobile unit 60. The mobile unit may optionally authenticate 62 the access point, possibly using the assistance of the security server. The mobile unit can then begin regular communications 76.

If none of the access points 20 is on the preferred list, the roaming control client 32 in the mobile unit 28 determines 58 if a given access point is on the excluded list 34. If not, the roaming control client creates a temporary association 56 with the best available access point. The security server 10 then optionally authenticates the mobile unit 60. The mobile unit may optionally authenticate 62 the access point 20, possibly using the assistance of the security server. The mobile unit can then begin regular communications 76.

If the access point 20 the mobile unit 28 is associated with is on the excluded association list, the roaming control client determines if there is another usable access point 66. If so, the roaming control client determines if the access point is on the excluded association list 58. If all available access points 20 are on the excluded association list 34, the roaming control client 32 indicates to the user of the mobile unit 28 that an association cannot be made. The user is given the option to synchronize the association lists on the wired network 18. The user then determines if this connection is possible 59. If not, the mobile unit continues to detect access points 51 until a usable one is discovered. If a wired network connection is possible, the user connects 68 the mobile unit to any available network device interface 24. The security server 10 then optionally authenticates 70 either the user or the mobile unit itself or both. Suitable authentication methods are discussed in a section below. If required, security information 14 on the security server 10 is exchanged to update the security information on the mobile unit 30 at this time. Once authenticated, the roaming control client on the roaming control client polls the roaming server 12 and determines if the association lists on the mobile unit 34 needs to be synchronized with the lists 16 on the server, and if so, updates the association lists 71. In an alternative embodiment, the roaming control server discovers the presence of the mobile unit at the network device interface and initiates the synchronization of the association control lists. Once the association lists on the mobile unit are synchronized, the mobile unit attempts to detect access points 51 and continues the process already described.

If no access point on the preferred list can be located the mobile unit 28 initiates a temporary access point 20 association 56, the roaming control client 32 discovers which roaming control server 12 and security server 10 to use on that sub-network 18 and optionally authenticates the servers 57. The security server then, optionally, authenticates 60 the mobile unit using the security information 14, 30. Suitable authentication methods are discussed in a section below. The mobile unit then optionally authenticates the association with the access point 62. The mobile unit then begins regular communications 76 through the sub-network 18 and beyond.

When a mobile unit 28 associates with a new sub-network 18 it discovers the security server 10 and roaming control server 12 with authority for that sub-network. The servers identify themselves to the mobile unit by a server identifier (server ID). This discovery process can use any suitable method, including:

(a) broadcasting a message to solicit a response from the servers indicating the server ID, followed by mutual authentication between the mobile unit and the servers;

(b) contacts the correct server for the sub-network (determined by the sub-network address) by a fixed or preset network (IP) address, typically followed by mutual authentication between the mobile unit and the servers; and, (c) connecting to central servers (typically at a fixed network address), which return the addresses for the servers used on that sub-network and, typically followed by mutual authentication between the mobile unit and the servers.

Once communications with the sub-network 18 and beyond have been established 76, the roaming control client 32 begins a regular process of roaming management. This process proceeds in an infinite loop until the mobile unit 28 is turned off or reinitialized.

The roaming control client 32 determines if the mobile unit 28 is roaming 78 to a new access point 20. If so the mobile unit detects the presence of other access points 80. The roaming control client determines 82 if the new access points are on a new sub-network 18. If so the access point invokes the correct association control lists for that sub-network 84. In either case, the roaming control client determines 54 if any of the access points detected are on the preferred association list 34. The process then proceeds as has already been described.

Periodically, the roaming control client 32 determines 92 if the mobile unit 28 is associated with an access point 20 on the preferred association list 34. If not, the mobile unit attempts to detect 94 an access point on the preferred association list. If a suitable access point can be found 96, the mobile unit associates with it 98. The roaming control client can then, optionally, authenticate the access point 100, using any suitable method as is described below.

If the roaming control server 12 has a new or updated association list 16 or lists available 102, the roaming control client 32 synchronizes 104 the updated list(s) to the mobile unit 28. The roaming control client periodically polls the roaming control server to determine if a new or update list is available. Alternatively, the roaming control server can notify the roaming control clients on the mobile units associated with the one or more sub-networks 18 whenever a new or updated list is available.

Use of Mandatory Association Lists

In situations where maximum security is required or where network administrators wish to limit the roaming of mobile units 28 for some other reason, a mandatory association list 34 is employed. When a mandatory association list is employed the roaming control client 32 forces the mobile unit to only associate with access points 20 that are on the list. In some embodiments, the roaming control client selects the correct association list based on the identifiers for the sub-network. Whenever a mobile unit 20 using a mandatory association list 34 is initialized or roams to a new sub-network it typically executes the following steps:

(a) the roaming control client 32 in the mobile unit 28 detects the presence of any access points 20 using standard IEEE 802.11 protocols;
(b) the roaming control client looks on the mandatory association list 34 to determine if any of the available access points are on that list; and,
(c) the mobile unit associates with one of the access points on the mandatory association list; and,
(d) optionally, the security server 10 authenticates the mobile unit and the mobile unit authenticates the access point using the methods described latter in this document.

If none of the available access points 20 are on the mandatory association list 34, the list may need to be synchronized or updated on the wired network 18. The mobile unit may inform the user of the need to synchronize the list. The user connects 68 the mobile unit to any available network device interface 24. The security server 10 then optionally authenticates either the user or the mobile unit itself or both. Suitable authentication methods are discussed in a section below. If required, security information on the security server 14 is exchanged to update the security information on the mobile unit 30 at this time. Once authenticated, the roaming control client on the mobile unit 28 polls the roaming control server 12 and determines if the association lists 34 on the mobile unit needs to be synchronized with the lists 16 on the server, and if so, updates the lists. In an alternative embodiment, the roaming server discovers the presence of the mobile unit at the network device interface and initiates the update. Once the mandatory association list on the mobile unit is updated, the mobile unit associates with one of the access points on the list and optionally authenticates the access point.

When the mobile unit 28 must roam to another access point 20, the roaming control client 32 typically executes the following steps:

(a) the roaming control client 32 in the mobile unit 28 detects the presence of any access points 20 using standard IEEE 802.11 protocols;
(b) the roaming control client looks on the mandatory association list 34 to determine if any of the available access points are on that list; and,
(c) the mobile unit associates with one of the access points on the mandatory association list; and,
(d) optionally, the mobile unit authenticates the access point using the methods described latter in this document.

Mobile Unit Authentication

The one or more security servers 10 can perform the authentication of the mobile unit 28 through any suitable method. In general a cryptographic authentication is preferred. Those skilled in the art will be familiar with multiple suitable methods.

In one embodiment, the security information 14, 30 on the security server 10 and the mobile unit 28 is a shared secret key. In this case messages with known content are typically exchanged between the security server and the roaming control client 32. If these messages can be decrypted satisfactorily, the server and the mobile unit have successfully authenticated each other. This authentication can be symmetric (as just described) or asymmetric where only the mobile unit is authenticated.

In another embodiment, the security information 14, 30 on the security server 10 and the mobile unit 28 is a Public Key Infrastructure (PKI) certificate. In this case the security server can act as the PKI certificate authority or certification authority. Alternatively. the security server can use an external certificate authority or certification authority. The authentication, once again, can be symmetric or asymmetric.

As an alternative or supplement to authentication of the mobile unit 28, the user can be authenticated. The security server 10 typically performs this authentication using the security information 14, 30. This authentication can be a simple user name and password login, preferably using an encrypted connection (i.e. SSL). Alternatively a cryptographic method can use techniques including PKI or shared factor authentication protocols such as Keberos.

In some embodiments, the security server 10 allows the mobile unit 28 a certain period of time to complete the authentication process. If the mobile unit cannot complete the authentication process within the prescribed period of time, the security service will consider the mobile unit to not be authenticatable. Alternatively, a mobile unit, which cannot execute the authentication protocol correctly, is considered not to be authenticatable. Access for none authenticatable mobile units can be restricted in any manner desired. Some examples of access restrictions include:

(a) The security server 10 can instruct the access points 20 to cease association with the non-authenticatable mobile unit 28, effectively preventing the mobile unit from obtaining access to the network 18;

(b) The security server 10 can connect the mobile unit 28 to the network 18, through the access points 20, using a restricted access virtual LAN. The virtual LAN may give the user of the mobile unit access to public services, including the Internet, but not internal services, as a guest user; and (c) The security server can allow connection of the mobile unit 28 to the network 18, through the access points 20, while limiting network services access using an access control list or other means.

In every case the security information 14, 30 on the security server 10 and the mobile unit 28 are preferably exchanged on a wired sub-network 18, using the device network interface 24, to improve security. Alternatively, the security information can be exchanged or updated over the wireless connection 26.

Access Point Authentication

To prevent spoofing attacks by foreign access points, the mobile unit 28 will usually authenticate any access points 20 it associates with. Access points do not typically have built in authentication capability. Still a number of suitable methods exist for this authentication. Generally, the mobile unit uses the services of the security server 10.

In one embodiment, the security server 10 subscribes to the messages from an SNMP trap 22 on the access point 20. When a mobile unit 28 associates with that access point, the trap sends a message indicating the association information. The roaming control client 32 on the mobile unit polls the security server, which verifies (or not) that it has received the message for that association. In an alternative embodiment, the security server transmits a authentication message to the roaming control client as soon as the SNMP message is received.

In another embodiment, the roaming control client 32 on the mobile unit 28, polls the security server 10, which in turn, polls the access point 20 to receive the MU association list 36. The security server verifies that the mobile unit association is on the list (or not) and reports the result to the roaming control client.

Management of Peer-To-Peer Associations

Peer-to-peer associations between mobile units 28 are manage by the roaming control client 32 using the security information 30 and association lists 34. These association lists are synchronized with the one or more roaming control servers 12 as has already been described. The roaming control clients can execute a number of peer-to-peer association policies, which can include but are not limited to:

(a) not allow any peer-to-peer or ad-hoc associations;

(b) only allow peer-to-peer associations between mobile units with mutual authentication capability, information on which mobile units have this capability possibly coming from a preferred association list;

(c) only allow peer-to-peer associations between mobile units on a specific mandatory association list; and, (d) only allow peer-to-peer associations between mobile units on a specific mandatory association list, and for which mutual authentication is possible.

The mobile units can perform mutual authentication during peer-to-peer associations in a number of suitable ways. Suitable techniques include:

(a) the mobile units exchange messages encrypted with a shared secret key or use a shared factor authentication protocol such as Keberos;

(b) the mobile units are authenticated through the security server 10, and the security server sends authentication messages to the mobile units participating in the association; and, (c) authentication through an external certificate authority or certification authority, possibly using PKI techniques.

Hierarchical Roaming Management

In many practical situations, multiple security servers 10 and/or multiple roaming control servers 12 will be used. The invention provides the capability to manage these multiple servers in a hierarchical structure. Generally, this hierarchy is organized with respect to a mobile unit 28 or a group of mobile units belonging to a particular organization. In other words, each organization with management responsibility for management of mobile units will create and manage a hierarchy suitable for its association policies. Typically, an organization will make one set of servers, under its control, the top of the hierarchy for the mobile units under its control. Both the roaming control servers and the security servers can manage mobile unit 28 associations on one or more sub-networks 18. For example, a company may choose to make the servers at the headquarters the top of the hierarchy with servers in departments and other sub-networks or geographic locations organized into a tree structure. In another example, a company may choose to use external service providers for wireless network access, and may therefore choose to make its own servers the root of the hierarchy with the service provider's servers as subservient.

The security information 14 in the hierarchy of security servers 10 and the association lists 16 in the roaming control servers 12 can be propagated to the other servers by any suitable methods. Two examples of such methods are:

(a) servers synchronize security information and association lists both up and down the hierarchy so that common information is held by all servers; and, (b) servers act as proxy servers for others up and down the hierarchy and thus do not store all information locally, but rather traverse the hierarchy to find the required information or services.

The method used to propagate the security information 14 and the association lists 16 need not be the same. In one example, the association lists are propagated to all roaming control servers 12 in the hierarchy, while security information is kept in a "home" security server 10 and is accessed by other security servers through a proxy protocol. Alternatively, each mobile unit 28 can store security information 30 for each sub-network 18 it uses. In this case, the security servers 10 for each sub-network contain the corresponding security information 14. The servers have a server ID, used by the mobile unit to refer to the correct servers for each sub-network.

Mobile units 28 connect to the appropriate servers for the sub-network 18 they are associating with. Methods used by the mobile units to discover the correct servers have already been discussed. The mobile units maintain one or more sets of association lists 34 for the access points 20 on each sub-network it uses. The correct set of association lists can be invoked based on the sub-network address and corresponding server ID. Alternatively, the appropriate lists 16 can be dynamically loaded from the roaming control server 12, whenever the mobile unit roams to sub-network.

Access List Management

The invention provides capabilities to reduce the workload on network managers or network administrators. These capabilities include, addition or deletion of new access points to the association lists 16 managed by the roaming control server 12, and the addition, updating and deletion of security information 14 in the security server 10. Updated association lists and security information is then propagated to the mobile units 20 as has already been described. Manual operations performed by network administrators are either performed on an integrated network management console or an application specific user interface.

The roaming control server 12 attempts to auto-discover the presence of the new access points 20 added to the network 18. Typically, the roaming control server auto-discovers a new access point by detecting its MAC address through monitoring of layer 2 packet headers or by monitoring inter-access point communications. Once a new access point is auto-discovered, the roaming control server adds it to the appropriate association lists 16. Generally, only access points that can be profiled and managed are added to the access lists. Access points that are of unknown or unmanageable types are typically added to the excluded list. At the same time, the roaming server notifies the security server 10 of the presence of the new access point. The security server then enforces security policies for the newly discovered access points and will subsequently be able to authenticate the association of mobile units with the new access points. As an added security and network administration measure, the management server may query a network administrator for approval before updating the lists. If multiple, distributed management servers are used, list updates are propagated to the other servers, as required. The update association management list is then propagated to all mobile units 28 associated with the managed access points on the sub-network 18.

In some embodiments, the roaming control server 12 can attempt to build preferred access point 20 association lists 16, 34 based on a number of criteria, as determined by administration policies. Examples of access point association policies, which can be used or combined arbitrarily, may include but are not restricted to:

(a) Access points 20 with better management capability;
(b) The level of security capability in the access point 20, with preference given to access points able to execute the security protocols best suited to the applications software being run on each particular mobile unit 28;
(c) The quality of service capabilities or capacity of the access point 20 and the network 18 connected to the access point. For example, mobile units 28 running applications requiring high bandwidth or fast response times may prefer to use higher capacity or faster access points, while access points with lower bandwidth or longer response times can be used by mobile units with less critical applications; or
(d) The cost of using a particular access point 20, with preference given to the least expensive association with suitable characteristics to run the applications or services required by each mobile unit 28.

In some embodiments, users of mobile units 28 can configure the association control lists 34. This configuration is allowed provided it does not violate any policy or setting configured by the one or more roaming control servers 12.

Alternative Association List Distribution

In some alternative embodiments, the association control lists 16, 34 are broadcast, on the wireless links 26, by the access points 20 to the mobile units 28 on a periodic basis. This broadcast may be a part of the beacon message access points periodically transmit or may be a separate broadcast. When a mobile unit wishes to associate with access points on a sub-network 18, it receives the association control list in the broadcasts from the one or more access points on the sub-network. The roaming control client 32 uses the information in the lists to allow the mobile unit to associate with one or the access points. Once associated, the mobile unit may be authenticated by the security server 10 and may then authenticate the access point, possibly using the services or the security server. In one embodiment, the list is signed by a trusted party and the signature is verified by the mobile unit before relying on the list.

If the mobile unit 28 is unable to authenticate the access point 20 or verify a trusted signature on the association lists 34, the association lists 34 received may not be trustworthy. The mobile unit may take one of a number of actions, including:

(a) continue the association with the unauthenticated access point while searching for association lists from an authenticatable access point;
(b) cease association with the unauthenticated access point and search for another authenticatable access point, and;
(c) limit information transmitted though the unauthenticated access point while searching for association lists from an authenticatable access point.

In many respects this alternative embodiment is similar to the embodiments already described. The only difference being the method used to distribute the association control lists. Other details of operation can be inferred from the previous discussion.

In some alternative embodiments the association management and authentication is performed on a centralized or distributed servers rather than on the mobile units. A diagrammatic view of one of these alternative embodiments is shown in FIG. 2. This discussion is intended to show an exemplary embodiment only. It will be understood by those skilled in the art that the functional blocks shown on the diagram can be combined or further distributed as required for a given implementation without changing the function, scope or spirit of the invention. Further, many of the details of other embodiments, already discussed, apply equally to the alternative embodiments.

Figure 3:
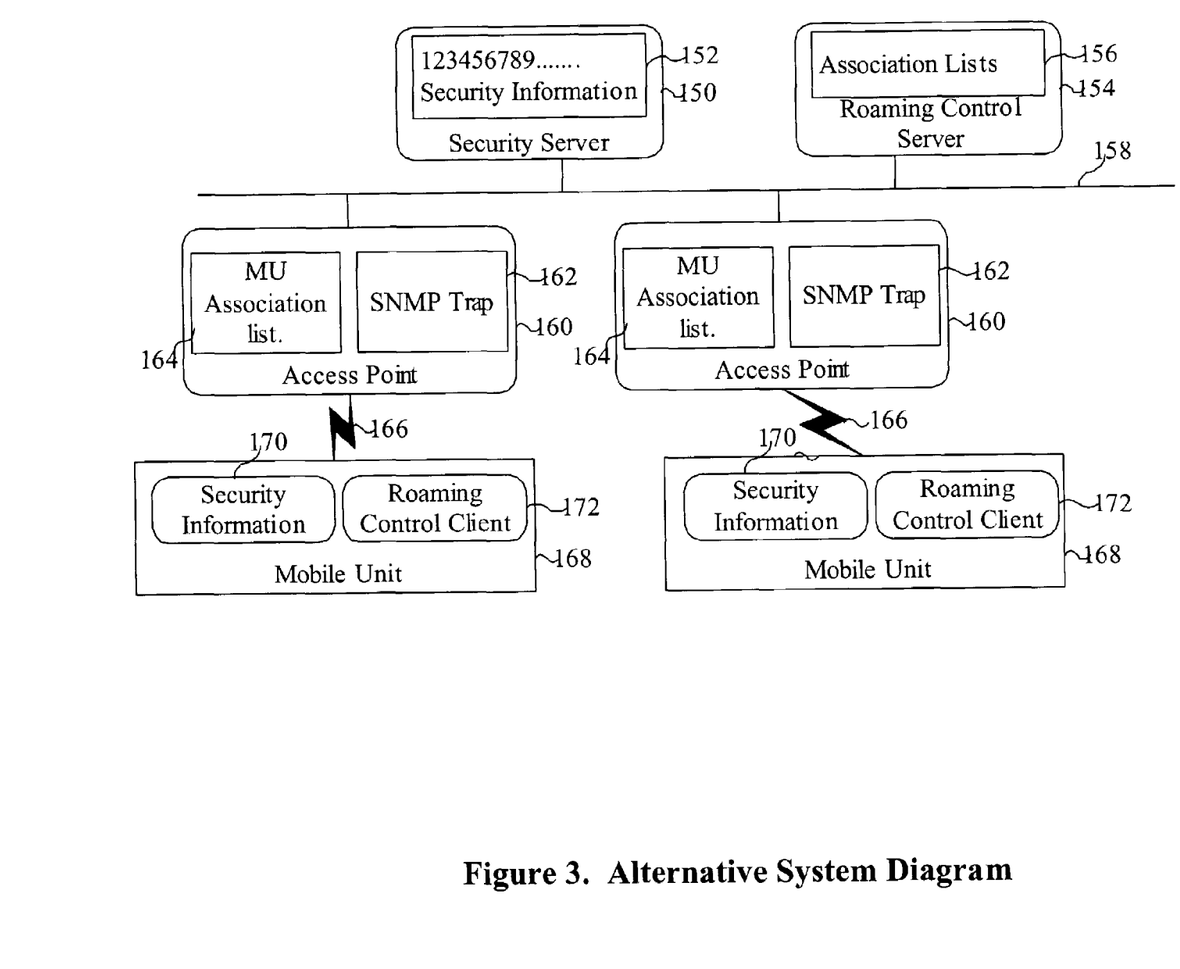

The roaming control server 154 manages the associations of the one or more mobile units 168 with the multiple access points 160 on one or more sub-networks 158, through the wireless links 166. The roaming control server creates and uses the one or more association lists 156 to determine mandatory access point associations, preferred access point associations and excluded access point associations for the mobile units. These association management policies have already been described. Methods for creation and management of the association lists and policies have already been discussed.

When a mobile unit 168 is initialized or needs to connect with a new sub-network 158, it creates a temporary association with an access point 160. The choice of this access point is determined by criteria that are familiar to those skilled in the art, such as, Received Signal Strength Indication (RSSI) on the wireless links 166. Once the temporary association has been made the security server 150 will optionally authenticate the mobile unit, generally through the exchange of security information 170 and comparing this information with the information stored in the server 152. Alternatively, other security methods such as Public Key Infrastructure can be applied. In some embodiments, the security server will periodically authenticate the access points 160. Suitable methods for the authentication of mobile units and access points have already been discussed in detail.

Once the mobile unit 168 has temporarily associated with an access point 160, and optionally been authenticated, the roaming control client 172 sends information (including ESSID, BSSID and RSSI) to the roaming control server 154. The roaming control server uses this information and the association control lists 156 to determine which access points 160 the mobile unit should associate with. The association information is transmitted to the roaming control client, possibly over a secure connection. The roaming control information can take the form of a mandatory command or a recommendation. Typically a recommendation is made in association with a prefer association list and a command is issued to enforce policies for excluded or mandatory association lists. Based on the information received the mobile unit takes the appropriate action, which may include:

(a) maintaining the association if the access point is on the preferred or mandatory association lists;
(b) changing association to a recommended access point, if one is available;
(c) ceasing association with an access point on an excluded list, and change association to an allow access point, if one is available; or
(d) ceasing association with an access point not on a mandatory association list and change association to an access point on the list, if one is available.

In some embodiments, the roaming control client 172 reports a new access point 160 association to the roaming control server 154. As an added security and network management step the roaming control server can optionally verify this association with the access point. This verification can be accomplished in a number of ways including, for example, (a) verifying that the mobile unit is on the MU association list 164 or (b) receiving an Simple Network Monitoring Protocol (SNMP) trap 162 from the access point indicating the new association.

Once the mobile unit 168 and roaming control server 154 have completed and possibly verified an access point 160 association, the mobile unit begins normal communications with one ore more entities connected to the sub-network 158, the wireless links 166, and beyond. In cases where the mobile unit is unable to perform the association instructions, the security server 150 cannot authenticate the mobile unit or the access point, or the roaming control server 154 cannot verify the association between the access point and the mobile unit, the to connections and services on the sub-network and beyond may be restricted. Methods to restrict network and service access have already been discussed in detail.

One or more security servers 150 and roaming control servers 154 can manage associations for the one or more sub-networks 158. The one or more sub-networks are typically interconnected and provide connectivity between one or more security servers, one or more roaming control servers. In some embodiments the security servers and roaming servers are organized hierarchically and a server can control associations and security on one or more sub-networks. Control or administration of the servers typically falls to the organization controlling the sub-networks managed. In some embodiments the roaming control servers and security servers can be distributed on the access points 160. The use and management of hierarchical servers have already been discussed in detail.

An embodiment encompasses a wireless communication security system, comprising a first wireless mobile device; and a program executing on the first wireless mobile device, the program configured to cause the first wireless mobile device to use an association control list to control communication with other wireless mobile devices; the association control list comprising a plurality of identifiers, each identifier uniquely identifying a wireless mobile device, wherein the identifiers comprise Independent Basic Service Set Identifiers (IBSSIDs).

What is claimed:

1. A system for securely accessing a wireless network, comprising:
   a wireless mobile device configured to use wireless network protocols conforming to one or more of the IEEE 802.11 family of specifications;
   wherein the wireless mobile device uses an association control list to control communication with access points; the association control list comprising a plurality of BSSIDs (Basic Service Set Identifier),
   wherein the association control list is updated via communication with a server, and
   wherein a second association control list and the association control list form at least a portion of an association control list hierarchy.

2. The system of claim 1, wherein the association control list is specific to one or more network segments.

3. A system for securely accessing a wireless network, comprising:
   a wireless mobile device;
   wherein the wireless mobile device uses an association control list to control communication with an access point, the association control list comprising digital data representing information concerning at least one access point and whether the wireless mobile unit should communicate with the at least one access point,
   wherein the association control list is updated by communicating with a server; and
   wherein the server is used to facilitate the authentication of the access point by the mobile unit.

4. The system of claim 3, wherein the wireless network conforms to one or more of the IEEE 802.11 family of specifications.

5. The system of claim 3, wherein the wireless network conforms to one or more standards promulgated by The Bluetooth.

6. The system of claim 3, wherein the wireless network is infrared.

7. The system of claim 3, wherein the association control list comprises a list of preferred access points with which the wireless mobile device will associate with.

8. The system of claim 7, wherein the wireless mobile device searches for an access point on the list of preferred access point when the wireless mobile unit is not associated with an access point on the list of preferred access points.

9. The system of claim 3, wherein the association control list is determined to reduce the cost of network access.

10. The system of claim 3, wherein the association control list is determined to increase network capacity and performance.

11. The system of claim 3, wherein the association control list comprises information identifying one or more access points with which the wireless mobile device is forbidden to associate.

12. The system of claim 3, wherein the association control list comprises information identifying one or more access points with which the wireless mobile device must exclusively associate.

13. The system of claim 3, wherein the communication occurs over the wireless network.

14. The system of claim 13, wherein access points are authenticated before updating the association control list via the access point.

15. The system of claim 3, wherein the communication occurs when the one or more mobile units are connected to a wired network.

16. The system of claim 3, wherein the server is authenticated before updating the association control list.

17. The system of claim 3, wherein the association control list is updated by communicating with a first server and is further updated by communicating with one or more additional servers.

18. The system of claim 17, wherein the first server and the one or more additional servers are hierarchically related.

19. The system of claim 17, wherein a precedence of association control policies applied the access control lists is determined with respect to the hierarchy.

20. The system of claim 3, wherein the association control list is updated by communicating with a first server, and a second association control list is updated by communicating with a second server, and
the mobile device uses the association control list and the second association control list to control communication with access points.

21. The system of claim 3, wherein the server automatically detects the presence of at least one new access point on at least one network segment and subsequently updates the association control list.

22. The system of claim 21, wherein the server adds the at least one access point with a known property or type to the association control list.

23. The system of claim 21, wherein the server adds information identifying one or more access points of unknown type or properties to at least one association control list so as to forbid wireless devices using the at least one association control list from associating with the one or more access points of unknown type or properties.

24. The system of claim 21, wherein authorization of a network administrator is required to update an association control list.

25. The system of claim 3, wherein the association control list is specific to one or more network segments.

26. The system of claim 3, wherein the mobile device selects among a plurality of association control lists to control communication with access points based on an access point identifier transmitted by each access point.

27. A system for securely accessing a wireless network, comprising:
a wireless mobile device comprising a processor and memory,
wherein the wireless mobile device associates with an access point and sends a request to a server for confirmation that the access point is authorized, the access point comprising a wireless device for communicating with other wireless devices and a wired network interface for communicating via a wired network,
wherein the wireless network conforms to one or more of the IEEE 802.11 family of specifications, and
wherein the wireless mobile device stores an identifier of the access point if the server does not confirm that the access point is authorized, and subsequently transmits the identifier to the server.

28. The system of claim 27, wherein the wireless mobile device ceases association with the access point if the wireless mobile device does not receive confirmation that the access point is authorized.

29. The system of claim 27, wherein the wireless network conforms to one or more standards promulgated by The Bluetooth.

30. The system of claim 27, wherein the wireless network is infrared.

31. The system of claim 27, wherein the server adds information identifying the access point to at least one association control list so as to forbid wireless devices using the at least one association control list from associating with the access point.

32. The system of claim 31, wherein authorization of a network administrator is required to update the list of access points.

33. A system for securely accessing a wireless network, comprising a server configured to receive a request to authenticate an access point from a wireless mobile device, the server being further configured to determine whether the wireless mobile device is associated with the access point and whether the access point is authorized, and to provide a response to the wireless mobile device indicating whether the mobile device is authorized to continue association with the access point,
wherein the server is further configured to detect each association between the access point and the wireless mobile device and to disable communications between the access point and the wireless mobile device if no request to authenticate the access point is received within a predetermined interval.

34. The system of claim 33, wherein the server restricts the network access or network service privileges of the mobile device if the mobile device is not authorized.

35. A wireless communication security system, comprising:
a first wireless mobile device;
a server system comprising a plurality of servers;
wherein the first wireless mobile uses an association control list to control communication with other wireless mobile devices via at least one access point; the association control list comprising a plurality of identifiers, each identifier uniquely identifying a wireless mobile device,
wherein one or more servers of the plurality of servers control the content of the association control list, and wherein the plurality of servers are organized hierarchically.

36. The system of claim 35, wherein the wireless network conforms to one or more of the IEEE 802.11 family of specifications.

37. The system of claim 35, wherein the wireless network conforms to one or more standards promulgated by The Bluetooth.

38. The system of claim 35, wherein the wireless network is infrared.

39. The system of claim 35, wherein the identifiers comprise IBSSIDs.

40. The system of claim 35, wherein the association control list comprises information identifying one or more other mobile units with which a given mobile unit is forbidden to associate with.

41. The system of claim 35, wherein the control list comprises information identifying one or more other mobile units with which a given mobile unit must exclusively associate with.

42. A system for securely accessing a wireless network, comprising:
a wireless mobile device,
wherein the mobile device uses an association control list to control communication with access points and to update the association control list by communicating with a server, and
wherein the association control list is a user-configurable association control list.

43. A system for securely accessing a wireless network comprising:
- a server system comprising a plurality of computer servers, wherein at least one server computer of the plurality of computer servers being operatively connected to a communications network,
- wherein the system being configured to receive at least one access point identifier from a wireless mobile unit via the communication network, the system being further configured to transmit to the wireless mobile unit information concerning at least one access point and whether the mobile unit should communicate with the at least one access point,
- wherein the a plurality of servers are organized hierarchically, and wherein the server system is further configured to receive an identifier of the mobile unit.

44. The system of claim 43, wherein the server system is further configured to apply a criterion to determine at least a portion of the information.

45. The system of claim 44, wherein the criterion is inclusion of an identifier in an association control list.

46. The system of claim 45, wherein the wireless mobile unit complies with one or more of the IEEE 802.11 family of standards.

47. The system of claim 46, wherein the access point identifier comprises a BSSID.

48. The system of claim 45, wherein the wireless network conforms to one or more standards promulgated by The Bluetooth.

49. The system of claim 45, wherein the association control list comprises information identifying one or more access points with which the unit is forbidden to associate with.

50. The system of claim 45, wherein the association control list comprises information identifying one or more access points with which the mobile unit must exclusively associate with.

51. The system of claim 45, wherein the wireless network is infrared.

52. A system for securely accessing a wireless network, comprising:
- a wireless mobile unit comprising a processor and memory,
- wherein the wireless mobile unit transmits to a server system comprising a plurality of servers a data structure comprising identifiers of access points within range of the wireless mobile units;
- wherein the wireless mobile unit receives from the server system information concerning at least one access point and whether the mobile unit should communicate with the at least one access point, and
- wherein the server system is organized hierarchically.

53. A system for securely accessing a wireless network, comprising:
- a wireless mobile unit comprising a processor and memory;
- wherein the wireless mobile unit receives an association control list from an access point, the association control list comprising digital data representing information concerning at least one access point and whether the wireless mobile unit should communicate with the at least one access point,
- wherein the association control list is updated by communicating with a server, and wherein the server is authenticated for associating the access point with the mobile unit before updating the association control list.

54. A system for securely accessing a wireless network comprising:
- an access point for communicating with wireless devices;
- a server system comprising a plurality of servers; and
- a wired network interface for communicating via a wired network,
- wherein the access point is configured to wirelessly transmit an association control list, the association control list comprising digital data representing information concerning at least one access point and whether at least one wireless mobile device should communicate with the at least one access point,
- wherein the access point is further configured to periodically broadcast the association control list,
- wherein one or more servers of the plurality of servers control the content of the association control list, and wherein the plurality of servers are organized hierarchically.

55. The system of claim 54, wherein the wireless network conforms to one or more of the IEEE 802.11 family of specifications.

56. The system of claim 55, wherein the digital data comprises a BSSID.

57. The system of claim 54, wherein the wireless network conforms to one or more standards promulgated by The Bluetooth.

58. The system of claim 54, wherein the wireless network is infrared.

59. The system of claim 54, wherein the association control list comprises information identifying one or more access points with which the at least one mobile device is forbidden to associate with.

60. The system of claim 54, wherein the association control list comprises information identifying one or more access points with which the at least one mobile device must exclusively associate with.

* * * * *